United States Patent
Kim et al.

(10) Patent No.: US 9,768,469 B2
(45) Date of Patent: Sep. 19, 2017

(54) SOLID ELECTROLYTE CONTAINING IONIC LIQUID

(71) Applicant: SAMSUNG SDI CO., LTD., Yongin-si, Gyeonggi-do (KR)

(72) Inventors: Sang Mi Kim, Incheon (KR); Hyun Cheol Lee, Daejeon (KR); Jin Hee Lee, Cheonan-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 74 days.

(21) Appl. No.: 14/421,055

(22) PCT Filed: Sep. 30, 2013

(86) PCT No.: PCT/KR2013/008738
§ 371 (c)(1),
(2) Date: Feb. 11, 2015

(87) PCT Pub. No.: WO2014/092312
PCT Pub. Date: Jun. 19, 2014

(65) Prior Publication Data
US 2015/0194701 A1    Jul. 9, 2015

(30) Foreign Application Priority Data

Dec. 12, 2012  (KR) .................. 10-2012-0144744

(51) Int. Cl.
*H01M 6/14*    (2006.01)
*H01M 10/0564*    (2010.01)
(Continued)

(52) U.S. Cl.
CPC .......... *H01M 10/0564* (2013.01); *H01B 1/06* (2013.01); *H01G 11/56* (2013.01);
(Continued)

(58) Field of Classification Search
CPC ....... H01B 1/06; H01G 11/56; H01M 10/052; H01M 10/0564; H01M 10/0565;
(Continued)

(56) References Cited

U.S. PATENT DOCUMENTS

2004/0224233 A1* 11/2004 Chen ............... H01M 4/60
429/303
2009/0246625 A1  10/2009 Lu
(Continued)

FOREIGN PATENT DOCUMENTS

GB          2 468 954 A      9/2010
JP          2000-195544 A    7/2000
(Continued)

OTHER PUBLICATIONS

Z. Li., et al.; "A Room-Temperature Ionic-Liquid-Templated Proton-Conducting Gelatinous Electrolyte;" The Journal of Physical Chemistry B., vol. 108, No. 45; 2004; pp. 17512-17518 (7 pages).
(Continued)

*Primary Examiner* — Patrick Ryan
*Assistant Examiner* — Ben Lewis
(74) *Attorney, Agent, or Firm* — Lee & Morse, P.C.

(57) ABSTRACT

The present invention is intended to provide a gel-type solid electrolyte having flexibility while maintaining the advantages of an ionic liquid by effectively internalizing the ionic liquid into a porous metal oxide. To this end, the present invention provides the gel-type solid electrolyte which includes an ionic liquid in a porous metal oxide prepared from a silane compound represented by the following Chemical Formula 1:

$$Si(R_1)_x(OR_2)_y(CR_3=CR_4R_5)_{(4-x-y)} \qquad \text{[Chemical Formula 1]}$$

in the Formula,
$R_1$ and $R_2$ are alkyl groups with carbon numbers in the range of 1 to 3, which are independent from each other;
(Continued)

$R_3$, $R_4$ and $R_5$ are each independently hydrogen, a halogen element or an alkyl group having 1 to 5 carbon atoms; and x is an integer in the range of $0 \leq x \leq 3$,
y is an integer in the range of $1 \leq y \leq 4$ and
x+y is an integer in the range of $2 \leq x+y \leq 4$.

13 Claims, 3 Drawing Sheets

(51) Int. Cl.
  *H01B 1/06*   (2006.01)
  *H01M 10/0565*  (2010.01)
  *H01G 11/56*   (2013.01)
  *H01M 10/052*   (2010.01)
  *H01M 10/0566*  (2010.01)

(52) U.S. Cl.
  CPC ..... *H01M 10/052* (2013.01); *H01M 10/0565* (2013.01); *H01M 10/0566* (2013.01); *H01M 2300/0045* (2013.01); *H01M 2300/0065* (2013.01); *H01M 2300/0085* (2013.01); *H01M 2300/0091* (2013.01); *Y02E 60/13* (2013.01)

(58) Field of Classification Search
  CPC ..... H01M 10/0566; H01M 2300/0045; H01M 2300/0065; H01M 2300/0085; H01M 2300/0091; Y02E 60/122; Y02E 60/13
  See application file for complete search history.

(56) References Cited

U.S. PATENT DOCUMENTS

| | | |
|---|---|---|
| 2010/0024204 A1 | 2/2010 | Min et al. |
| 2010/0248025 A1* | 9/2010 | Kimura ............... H01M 10/052 429/207 |
| 2011/0076572 A1 | 3/2011 | Amine et al. |
| 2011/0081583 A1* | 4/2011 | Sugimoto ............. H01M 2/145 429/346 |
| 2011/0117446 A1* | 5/2011 | Lucht .................. H01M 10/052 429/332 |
| 2012/0154981 A1* | 6/2012 | Lee ........................ H01G 11/52 361/502 |
| 2013/0157129 A1 | 6/2013 | Uemura et al. |

FOREIGN PATENT DOCUMENTS

| | | |
|---|---|---|
| JP | 2001-126726 A | 5/2001 |
| JP | 2005-276517 A | 10/2005 |
| JP | 2009-181788 A | 8/2009 |
| JP | 2003-257239 A | 9/2009 |
| JP | 2010-225511 A | 10/2010 |
| WO | WO 2012/029858 A1 | 3/2012 |

OTHER PUBLICATIONS

International Search Report for corresponding International Application No. PCT/KR2013/008738, mailed Dec. 30, 2013 (2 pages).
Extended European Search Report dated Jun. 8, 2016 in Corresponding European Patent Application No. 13862533.0.

* cited by examiner

SOLID ELECTROLYTE CONTAINING IONIC LIQUID

TECHNICAL FIELD

The present invention relates to a solid electrolyte which is applied to an electrochemical double layer capacitor (EDLC) or a lithium secondary battery, and provides a gel-type solid electrolyte having flexibility.

BACKGROUND ART

An organic electrolyte used for a lithium secondary battery or an electrochemical double layer capacitor (EDLC) has been currently widely used for a lithium ion battery or an EDLC as a liquid electrolyte in which a lithium salt such as $LiPF_6$, $LiBF_4$, $LiN(CF_3SO_2)_2$, $LiClO_4$, and $LiCF_3SO_3$ is dissolved in a polar non-protic organic solvent, which easily dissolves a lithium salt, and is also difficult to be electrolyzed, for example, an organic solvent such as carbonates such as ethylene carbonate and propylene carbonate, carbonic esters such as dimethyl carbonate, methyl ethyl carbonate, and diethyl carbonate, lactones such as γ-butyrolactone and 3-methyl-α-valerolactone, esters such as methyl formate, methyl acetate and methyl propionate, and ethers such as 1,2-dimethoxyethane, tetrahydrofuran, and dioxolane. However, even though the organic electrolyte has high ion conductivity, the organic electrolyte has problems in the process due to low stability caused by volatility, decomposition reactions at the electrode, and the like and the liquid state.

Among the solvents, particularly dimethyl carbonate or 1,2-dimethoxy ethane has such a low flash point that these solvents have problems in view of safety of a battery, such as a flash or an explosion caused by generation of heat at the time of overcharging or short-circuiting, and particularly, in recent years, development of a high capacitance and high output lithium secondary battery is urgently needed, and thus a problem of safety becomes increasingly an important problem to be solved. For this reason, it has been proposed to use phosphoric esters, esters or specific phosphoric ester compounds as a non-aqueous electrolytic solution (the official gazettes of Japanese Patent Application Laid-Open Nos. 2000-1995544 and 2001-126726), or to use a flame retardant compound such as an electrolytic solution (the official gazette of Japanese Patent Application Laid-Open No. 2005-276517) including a specific fluorinated ketone in a non-protic solvent.

Meanwhile, an ionic liquid is a normal-temperature molten salt composed of a positive ion and a negative ion, and has characteristics such as non-volatility, flame retardancy, non-inflammability, a wide potential window, and chemical stability, and thus has drawn attention as alternative electrolytes which may solve stability problems of the organic electrolyte. However, the ionic liquid is also in a liquid state at normal temperature, and thus has a disadvantage in which processability deteriorates when the ionic liquid is applied as an electrolyte.

In order to complement the disadvantage, the official gazette of Japanese Patent Application Laid-Open No. 2010-225511 suggests a gel-type electrolyte with improved durability, which is formed by internalizing the ionic liquid into porous particles. However, the solid electrolyte prepared by using only a porous metal oxide has no flexibility, and thus has a problem in that a product may easily break by external impact or when the solid electrolyte is applied to the product.

DISCLOSURE

Technical Problem

The present invention has been made in an effort to provide a gel-type solid electrolyte having improved flexibility while maintaining the advantages of the existing ionic liquid, as a solid electrolyte used for a lithium ion battery or an electrochemical double layer capacitor (EDLC).

Technical Solution

The present invention provides a gel-type solid electrolyte including an ionic liquid in a porous metal oxide prepared from a silane compound represented by the following Chemical Formula 1:

$$Si(R_1)_x(OR_2)_y(CR_3=CR_4R_5)_{(4-x-y)}$$ [Chemical Formula 1]

in the Formula, $R_1$ and $R_2$ are each independently an alkyl group having 1 to 3 carbon atoms;

$R_3$, $R_4$ and $R_5$ are each independently hydrogen, a halogen element or an alkyl group having 1 to 5 carbon atoms; and x is an integer in the range of $0 \leq x \leq 3$, y is an integer in the range of $1 \leq y \leq 4$ and x+y is an integer in the range of $2 \leq x+y \leq 4$.

Preferably, the porous metal oxide includes 30 to 50 wt % of the silane compound in which $2 \leq x+y \leq 3$ in Chemical Formula 1.

Preferably, the porous metal oxide is formed from a hydrolysis reaction of the silane compound of Chemical Formula 1 in the presence of an acid.

Preferably, the acid is used in a range of 1 to 50 parts by volume based on the entire silane compound of Chemical Formula 1.

Preferably, the porous metal oxide includes a structure represented by the following Chemical Formula:

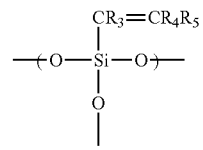

in the Formula, $R_3$, $R_4$ and $R_5$ are each independently hydrogen, a halogen element or an alkyl group having 1 to 5 carbon atoms.

Preferably, the ionic liquid includes imidazolium, ammonium, pyrrolidinium, or piperidinium as a positive ion, and bis(fluorosulfonyl)imide, bis(fluorosulfonyl)amide, fluoroborate, or fluorophosphate as a negative ion.

Preferably, the ionic liquid is included in a range of 100 to 200 parts by weight based on 100 parts by weight of the porous metal oxide.

Preferably, the solid electrolyte includes one or more lithium salts selected from the group consisting of $LiPF_6$, $LiBF_4$, $LiAsF_6$, $LiSbF_6$, $LiCF_3SO_3$, $LiC_2F_5SO_3$, $LiC_4F_9SO_3$, $LiN(CF_3SO_2)_2$, $LiN(C_2F_5SO_2)_2$, $LiC(CF_3SO_2)_3$, and $LiPF_2\{(COO)_2\}_2$. Preferably, the lithium salt is included in an amount of 5 to 40 wt % based on the entire solid electrolyte.

The present invention provides a lithium secondary battery including the solid electrolyte.

The present invention provides an electrochemical double layer capacitor including the solid electrolyte.

Advantageous Effects

According to the present invention, it is possible to improve processability of an ionic liquid by providing a gel-type solid electrolyte having improved flexibility, which includes the ionic liquid. Accordingly, the electrolyte may be advantageously used in the process of manufacturing a lithium secondary battery or an electrochemical double layer capacitor, which is intended to use the advantages of an ionic liquid.

BEST MODE

Figure 1:
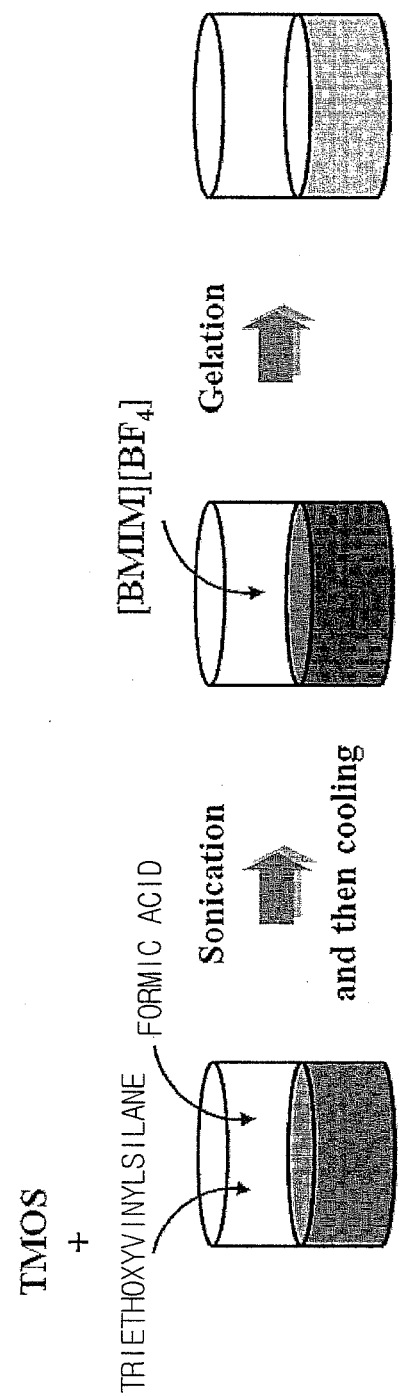
FIG. 1 illustrates a process of preparing a solid electrolyte according to an exemplary embodiment of the present invention.

The present invention provides a gel-type solid electrolyte having improved flexibility while maintaining the advantages of an ionic liquid by effectively internalizing the ionic liquid into a porous metal oxide. The porous metal oxide is prepared from a silane compound represented by the following Chemical Formula 1:

$$Si(R_1)_x(OR_2)_y(CR_3\!=\!CR_4R_5)_{(4-x-y)}$$ [Chemical Formula 1]

in the formula, $R_1$ and $R_2$ are each independently an alkyl group having 1 to 3 carbon atoms;

$R_3$, $R_4$ and $R_5$ are each independently hydrogen, a halogen element or an alkyl group having 1 to 5 carbon atoms; and x is an integer in the range of $0 \le x \le 3$, y is an integer in the range of $1 \le y \le 4$ and x+y is an integer in the range of $2 \le x+y \le 4$.

In general, the silane compound forms a silane oxide compound having a network structure by a hydrolysis reaction. The present invention uses a silane compound including a vinyl group in the case of $2 \le x+y \le 3$ in Chemical Formula 1 in a hydrolysis reaction of a silane compound, as a porous metal oxide for internalizing an ionic liquid thereinto. The silane compound including a vinyl group is included among the silane oxide compounds to form the following structure as an example of a part of a network structure:

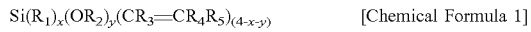

When the process in which the porous metal oxide of the present invention is formed is reviewed in more detail, the network structure is formed from a hydrolysis reaction of the silane compound of Chemical Formula 1, and in this case, a silane compound including a vinyl group is introduced into each of the middles of the structures, thereby leading to termination of the network structure. That is, when the silane compound including a vinyl group is not present, the network structure keeps being produced, and accordingly, the viscosity of a material to be obtained keeps being increased, thereby resulting in a hard state in which it is difficult to be processed. The vinyl group is for inducing termination of the network structure to obtain an easily processable product in a flexible state. Therefore, it is a means for forming a backbone of a flexible solid electrolyte to use a silane compound including a vinyl group in the present invention.

The present invention provides a solid electrolyte in which an ionic liquid is internalized into a porous metal oxide obtained from a hydrolysis reaction of the silane compound represented by Chemical Formula 1. In this case, in order to control the effect of improving flexibility of the solid electrolyte, the porous metal oxide includes preferably 30 to 50 wt % of a silane compound including a vinyl group, that is, a silane compound in the case of $2 \le x+y \le 3$ in Chemical Formula 1. When the silane compound including a vinyl group is used in an amount less than the range, the effect of improving flexibility is so negligible that processability deteriorates, such as breakage in the process for using the silane compound as a solid electrolyte. In contrast, when the silane compound including a vinyl group is used in an excessive amount more than the range, gelation is not achieved at a preferred level, and accordingly, processability also deteriorates for this reason.

For the hydrolysis reaction, the reaction is performed preferably under acidic conditions. As the acid, it is possible to use an organic acid such as formic acid, hydrochloric acid, sulfuric acid, phosphoric acid, nitric acid and acetic acid. The amount of these acids used is preferably in a range of 1 to 50 parts by volume based on the entire silane compound of Chemical Formula 1. These acids are used in the range because when the amount of acid used is less than the range, hydrolysis does not occur at a preferred level, and when the amount is more than the range, the viscosity of a gel-type porous metal oxide to be obtained becomes so high that it becomes difficult for the acid to be subsequently mixed with the ionic liquid.

Next, in order to cause a hydrolysis to uniformly and effectively occur in a reactant including the silane compound of Chemical Formula 1 and an acid, it is preferred that the solution is ultrasonicated. The ultrasonication may be performed under the condition of 40 KHz for 1 to 20 minutes. After the ultrasonication, the solution is cooled at 0° C. to 10° C. for 1 to 120 minutes.

And then, the ionic liquid is added so as to perform the gelation. That is, the silane compound of Chemical Formula 1 is hydrolyzed to form a porous metal oxide having a network structure, and simultaneously, impregnation of the ionic liquid occurs, thereby preparing the gel-type solid electrolyte in the present invention in a form in which the ionic liquid is included in the porous metal oxide structure.

The ionic liquid may be used without limitation as long as the ionic liquid is an ionic material which is in a molten state at normal temperature (25° C.), and includes a positive ion and a negative ion. The ionic liquid includes, but is not limited to, imidazolium, ammonium, pyrrolidinium or piperidinium as the positive ion, and includes, but is not limited to, bis(fluorosulfonyl)imide, bis(fluorosulfonyl)amide, fluoroborate, or fluorophosphate as the negative ion. Specific examples of the positive ion include alkyl ammonium such as triethyl ammonium, imidazolium such as ethyl methyl imidazolium and butyl methyl imidazolium, pyrrolidinium such as 1-methyl-1-propyl pyrrolidinium, or methyl propyl piperidinium. Further, specific examples of the negative ion include bis(trifluoromethylsulfonyl)imide (TFSI), bis(pentafluoroethylsufonyl)amide (BETI), tetrafluoroborate ($BF_4$), or hexafluorophosphate ($PF_6$).

The ionic liquid may be used alone as an electrolyte without using a separate solvent. In addition, for ion conductivity and capacitance characteristics, it is preferred that the ionic liquid is included in the solid electrolyte in a range of 100 to 200 parts by weight based on 100 parts by weight of the porous metal oxide.

After the gelation of the porous metal oxide and the ionic liquid, the solid electrolyte of the present invention is finally obtained by drying the gelled product at normal temperature for 1 hour or more, or subjecting the gelled product to heat treatment in a temperature range of 300° C. to 600° C. for 5 to 10 minutes. The electrolyte thus obtained is a gel-type solid having improved flexibility, and thus is easily processed. Accordingly, the electrolyte thus obtained may be easily used as a solid electrolyte in the process of manufacturing a lithium secondary battery or an electrochemical double layer capacitor.

Meanwhile, the solid electrolyte of the present invention may additionally include one or more lithium salts selected from the group consisting of $LiPF_6$, $LiBF_4$, $LiAsF_6$, $LiSbF_6$, $LiCF_3SO_3$, $LiC_2F_5SO_3$, $LiC_4F_9SO_3$, $LiN(CF_3SO_2)_2$, $LiN(C_2F_5SO_2)_2$, $LiC(CF_3SO_2)_3$, and $LiPF_2\{(COO)_2\}_2$. The solid electrolyte including a lithium salt may be used as an electrolyte of the lithium ion battery. In this case, the lithium salt is included in an amount of preferably 5 to 40 wt % based on the entire solid electrolyte. In addition, when a lithium salt is included, it is preferred that gelation for forming a solid electrolyte is performed by adding the lithium salt together with an ionic liquid to a process of introducing the ionic liquid into a reactant including a silane compound, a vinyl silane compound, and an acid. That is, the lithium salt is included together with the ionic liquid in a porous metal oxide structure.

Specifically, as a method of including a lithium salt, a gel-type solid electrolyte including a lithium salt and an ionic liquid is synthesized by dissolving the lithium salt in the ionic liquid in a glove box under the Ar atmosphere using a stirrer for 24 hours or more, and then introducing the ionic liquid, in which the lithium salt is dissolved, to the gelation process. Also, the lithium salt may be used in the form of an electrolytic solution in which the lithium salt is dissolved in a solvent such as dimethyl carbonate (DMC), diethyl carbonate (DEC), methyl ethyl carbonate (MEC), ethylene carbonate (EC), propylene carbonate (PC), or a mixture thereof. After the lithium salt dissolved in the solution is included in a porous metal oxide structure, the solvent is volatilized and removed in the drying or heat treatment process.

Hereinafter, the present invention will be described in detail through Examples. However, since this is for helping to understand the present invention, it should not be understood that the present invention is limited thereto.

EXAMPLE

As illustrated in FIG. 1, 1 mL of 1 M formic acid was put into a cylindrical reaction vessel, and 1 mL of tetramethoxysilane (TMOS) and 1 mL of triethoxyvinylsilane were added thereto while being stirred. And then, the solution was ultrasonicated in an ultrasonic cleaner under the condition of 40 KHz for 30 minutes, and then was cooled at 5° C. for 20 minutes. And then, 1 mL of butyl methyl imidazolium tetrafluoroborate ($BMIMBF_4$) as an ionic liquid was put into the vessel, and gelation was allowed to occur. The product obtained above was dried at room temperature for 1 hour to finally obtain a gel-type solid electrolyte.

Comparative Example

A solid electrolyte was obtained in the same manner as in the Example, except that 2 mL of tetramethoxysilane was used instead of 1 mL of tetramethoxysilane (TMOS) and 1 mL of triethoxyvinylsilane.

Evaluation

1) Electrical Characteristics

With respect to the solid electrolytes obtained in the Example and the Comparative Example, ion conductivity and electric capacitance were measured.

Figure 2:
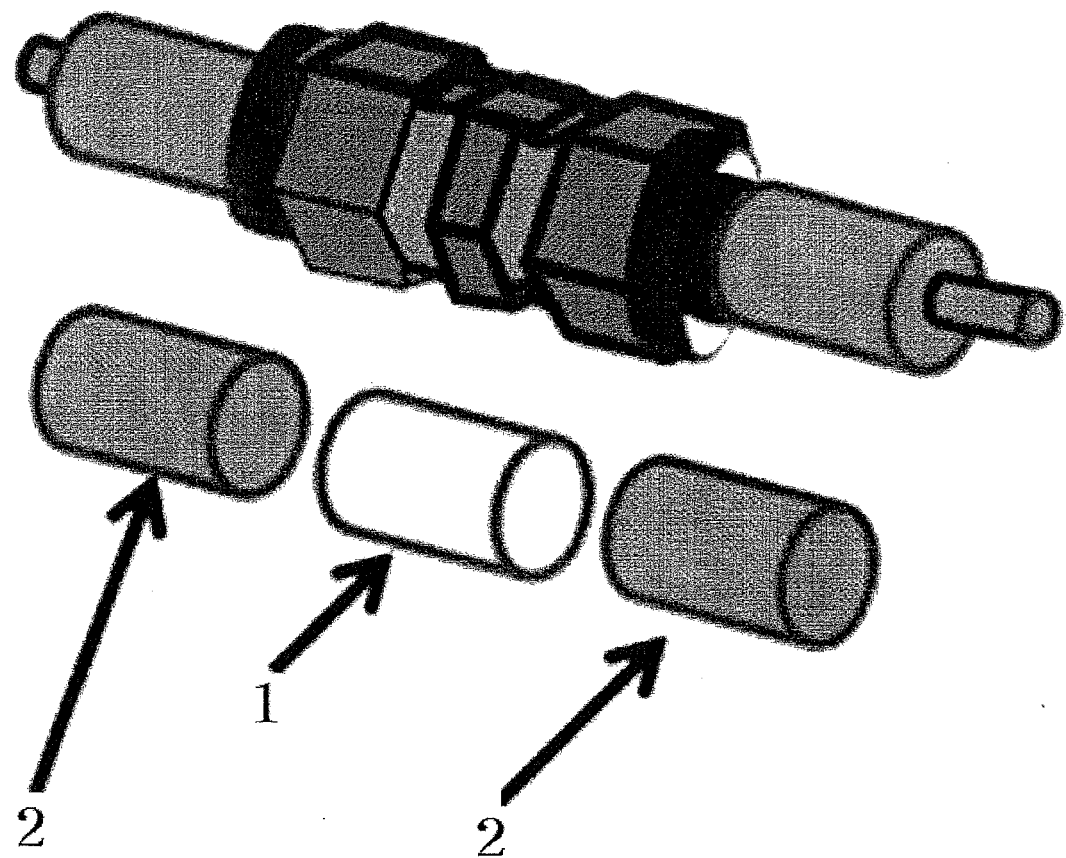
FIG. 2 illustrates a device which measures the ion conductivity of the solid electrolyte of the present invention.

First, in order to measure ion conductivity, as illustrated in FIG. 2, a solid electrolyte 1 was inserted into a conductivity measurement cell (Swagelok cell) composed of two stainless steel electrodes 2, and conductivity was measured by performing impedance in a range from $2 \times 10^{-2}$ Hz to $10^6$ Hz.

The measurement results are shown in the following Table 1. For comparison, ion conductivity of the ionic liquid $BMIMBF_4$ measured in the same device and conditions is shown together.

TABLE 1

|  | Ion conductivity (mS/cm) |
| --- | --- |
| $BMIMBF_4$ | 1.70 |
| Example | 0.44 |
| Comparative Example | 0.43 |

The ion conductivities of both the electrolytes in the Example and the Comparative Example were a little reduced compared to that of the ionic liquid butyl methyl imidazolium tetrafluoroborate ($BMIMBF_4$), but exhibited ion conductivities sufficient to be used as an electrolyte.

Figure 3:
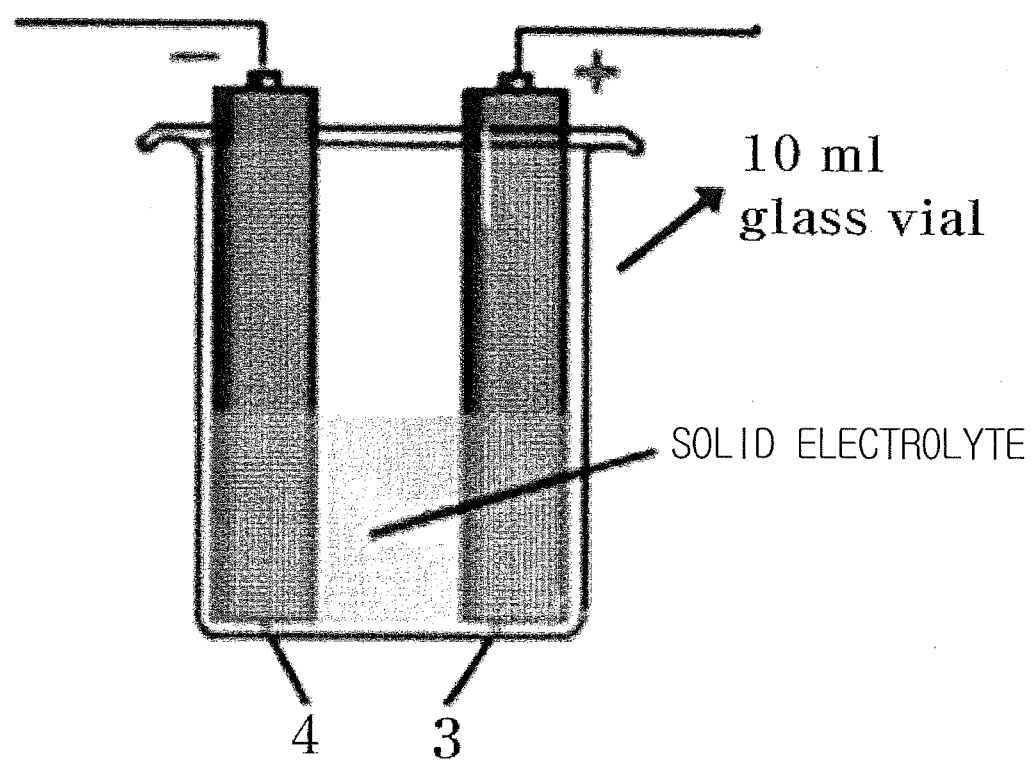
FIG. 3 illustrates a device which measures the capacitance in an electrochemical double layer capacitor to which the solid electrolyte of the present invention is applied.

Next, the capacitance of an electrochemical double layer capacitor, which is manufactured by applying the solid electrolytes obtained in the Example and the Comparative Example to the device as illustrated in FIG. 3, was measured. A carbon nanotube (CNT) electrode formed on a stainless steel mesh was used as a working electrode 3, and a stainless steel foil was used as a counter electrode or a reference electrode 4. Cyclic voltammetry was used for measuring the capacitance, and the capacitance was measured in a range of 0 V to 2.7 V at a scan rate of 100 mV/s.

The measurement results are shown in the following Table 2. For comparison, the capacitance of the ionic liquid $BMIMBF_4$ measured in the same device and conditions is shown together.

TABLE 2

|  | Capacitance (F/g) |
| --- | --- |
| $BMIMBF_4$ | 30 |
| Example | 25 |
| Comparative Example | 22 |

The capacitances of both the electrolytes in the Example and the Comparative Example were minimally reduced compared to that of the ionic liquid butyl methyl imidazolium tetrafluoroborate ($BMIMBF_4$).

2) Mechanical Characteristics

In order to compare mechanical characteristics of the solid electrolytes suggested as the Example and the Comparative Example, the degree of flexibility was measured by the following method.

First, the solid electrolytes in the Example and the Comparative Example were each manufactured into a frame with a size of 70 mm (width)×150 mm (length)×30 mm (thickness). And then, the center of the sample was fixed, and an angle was measured until a crack was generated by applying a force of 10 N to the sample in the same direction at both the ends of the sample.

TABLE 3

|  | Crack angle |
|---|---|
| Example | 40 |
| Comparative Example | 2 |

It was confirmed that the electrolyte in the Comparative Example had almost no flexible properties, whereas the electrolyte in the Example had flexibility in which the sample could be bent up to 40 degrees.

The invention claimed is:

1. A gel-type solid electrolyte, comprising:
   an ionic liquid in a porous metal oxide prepared from a silane compound represented by the following Chemical Formula 1:

$Si(R_1)_x(OR_2)_y(CR_3=CR_4R_5)_{(4-x-y)}$     [Chemical Formula 1]

wherein $R_1$ and $R_2$ are each independently an alkyl group having 1 to 3 carbon atoms; $R_3$, $R_4$ and $R_5$ are each independently hydrogen, a halogen element or an alkyl group having 1 to 5 carbon atoms; and x is an integer in the range of $0 \leq x \leq 3$, y is an integer in the range of $1 \leq y \leq 4$ and x+y is an integer in the range of $2 \leq x+y \leq 4$, and wherein the porous metal oxide comprises 30 to 50 wt % of the silane compound in which $2 \leq x+y \leq 3$ in Chemical Formula 1.

2. The gel-type solid electrolyte of claim 1, wherein the porous metal oxide is formed from a hydrolysis reaction of the silane compound of Chemical Formula 1 in the presence of an acid.

3. The gel-type solid electrolyte of claim 2, wherein the acid is used in a range of 1 to 50 parts by volume based on the entire silane compound of Chemical Formula 1.

4. The gel-type solid electrolyte of claim 1, wherein the porous metal oxide comprises a structure represented by the following Chemical Formula:

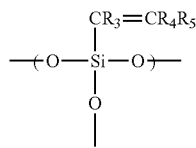

wherein $R_3$, $R_4$ and $R_5$ are each independently hydrogen, a halogen element or an alkyl group having 1 to 5 carbon atoms.

5. The gel-type solid electrolyte of claim 1, wherein the ionic liquid comprises one or more selected from imidazolium, ammonium, pyrrolidinium, and piperidinium as a positive ion, and one or more selected from the group consisting of bis(fluorosulfonyl)imide, bis(fluorosulfonyl)amide, fluoroborate, and fluorophosphate as a negative ion.

6. The gel-type solid electrolyte of claim 1, wherein the ionic liquid is comprised in a range of 100 to 200 parts by weight based on 100 parts by weight of the porous metal oxide.

7. The gel-type solid electrolyte of claim 1, further comprising: one or more lithium salts selected from $LiPF_6$, $LiBF_4$, $LiAsF_6$, $LiSbF_6$, $LiCF_3SO_3$, $LiC_2F_5SO_3$, $LiC_4F_9SO_3$, $LiN(CF_3SO_2)_2$, $LiN(C_2F_5SO_2)_2$, $LiC(CF_3SO_2)_3$, and $LiPF_2\{(COO)_2\}_2$.

8. The gel-type solid electrolyte of claim 7, wherein the lithium salt is comprised in an amount of 5 to 40 wt % based on the entire solid electrolyte.

9. A lithium secondary battery comprising the solid electrolyte of claim 1.

10. An electrochemical double layer capacitor, comprising:
    a gel-type solid electrolyte that includes an ionic liquid in a porous metal oxide, the porous metal oxide being prepared from a silane compound represented by the following Chemical Formula 1:

$Si(R_1)_x(OR_2)_y(CR_3=CR_4R_5)_{(4-x-y)}$     [Chemical Formula 1]

wherein $R_1$ and $R_2$ are each independently an alkyl group having 1 to 3 carbon atoms; $R_3$, $R_4$ and $R_5$ are each independently hydrogen, a halogen element or an alkyl group having 1 to 5 carbon atoms; and x is an integer in the range of $0 \leq x \leq 3$, y is an integer in the range of $1 \leq y \leq 4$ and x+y is an integer in the range of $2 \leq x+y \leq 4$, and wherein the porous metal oxide comprises 30 to 50 wt % of the silane compound in which $2 \leq x+y \leq 3$ in Chemical Formula 1.

11. A gel-type solid electrolyte, comprising:
    an ionic liquid in a porous metal oxide prepared from a silane compound represented by the following Chemical Formula 1:

$Si(R_1)_x(OR_2)_y(CR_3=CR_4R_5)_{(4-x-y)}$     [Chemical Formula 1]

wherein $R_1$ and $R_2$ are each independently an alkyl group having 1 to 3 carbon atoms; $R_3$, $R_4$ and $R_5$ are each independently hydrogen, a halogen element or an alkyl group having 1 to 5 carbon atoms; and x is an integer in the range of $0 \leq x \leq 3$, y is an integer in the range of $1 \leq y \leq 4$ and x+y is an integer in the range of $2 \leq x+y \leq 4$, and wherein the ionic liquid is comprised in a range of 100 to 200 parts by weight based on 100 parts by weight of the porous metal oxide.

12. A lithium secondary battery comprising the solid electrolyte of claim 11.

13. An electrochemical double layer capacitor comprising the solid electrolyte of claim 11.

* * * * *